(12) United States Patent
Rubinstein

(10) Patent No.: US 7,788,384 B1
(45) Date of Patent: Aug. 31, 2010

(54) VIRTUAL MEDIA NETWORK

(75) Inventor: Nadav Rubinstein, Herzeliya (IL)

(73) Assignee: Volicon, Inc., Burlington, MA (US)

( * ) Notice: Subject to any disclaimer, the term of this patent is extended or adjusted under 35 U.S.C. 154(b) by 267 days.

(21) Appl. No.: 12/101,543

(22) Filed: Apr. 11, 2008

Related U.S. Application Data

(60) Provisional application No. 60/911,680, filed on Apr. 13, 2007.

(51) Int. Cl.
*G06F 15/16* (2006.01)

(52) U.S. Cl. .................................................. 709/227

(58) Field of Classification Search .......... 709/227–229
See application file for complete search history.

(56) References Cited

U.S. PATENT DOCUMENTS

| | | | |
|---|---|---|---|
| 6,157,634 A * | 12/2000 | Mehta et al. ................. 370/351 |
| 6,636,220 B1 | 10/2003 | Szeliski et al. |
| 6,674,750 B1 * | 1/2004 | Castellano .................. 370/354 |
| 7,221,710 B2 | 5/2007 | Lee |
| 7,295,614 B1 | 11/2007 | Shen et al. |
| 7,463,595 B1 * | 12/2008 | Singhal et al. .............. 370/254 |
| 7,529,816 B2 * | 5/2009 | Hayden et al. .............. 709/220 |
| 7,577,088 B2 * | 8/2009 | Tidwell et al. .............. 370/217 |
| 2004/0037361 A1 | 2/2004 | Gudis |
| 2007/0058949 A1 * | 3/2007 | Hamzy et al. ............... 386/112 |

FOREIGN PATENT DOCUMENTS

CA 2437003 2/2004

* cited by examiner

*Primary Examiner*—Benjamin R Bruckart
*Assistant Examiner*—Alicia Baturay
(74) *Attorney, Agent, or Firm*—Burns & Levinson LLP; Jerry Cohen; Orlando Lopez

(57) ABSTRACT

A system and method for setting up and reconfiguring a multimedia system dynamically to transport and process streams of multimedia data.

17 Claims, 7 Drawing Sheets

| CHANNEL NAME | MN | ME | METX | MN | ME | MERX |
|---|---|---|---|---|---|---|
| CHA1 | A7 | 1 | 1 | A18 | 1 | 1 |
| CHA2 | A7 | 1 | 2 | A18 | 1 | 2 |
| CHA3 | A7 | 1 | 3 | A18 | 1 | 3 |
| CHA4 | A7 | 1 | 4 | A18 | 1 | 4 |
| CHB1 | A14 | 1 | 1 | A18 | 1 | 5 |
| CHB2 | A14 | 1 | 2 | A18 | 1 | 6 |
| CHB3 | A14 | 1 | 3 | A18 | 1 | 7 |
| CHB4 | A14 | 1 | 4 | A18 | 1 | 8 |

FIG. 6

VIRTUAL MEDIA NETWORK

CROSS REFERENCE TO RELATED APPLICATIONS

This application claims priority under 35 U.S.C. §119 from U.S. Provisional Patent Application Ser. No. 60/911,680 entitled VIRTUAL MEDIA NETWORK, filed on Apr. 13, 2007.

BACKGROUND

What is needed is a multimedia system, adaptable to various geographic, network and performance requirements that can provide multimedia data and services to plurality of users from a plurality of sources through interchangeable media components.

SUMMARY

The needs set forth above as well as further and other needs and advantages are addressed by the by the illustrative embodiments described herein below.

The method of the present embodiment for setting up and reconfiguring a multimedia system dynamically to transport and process streams of multimedia data can include, but is not limited to including, the steps of creating transmitting media elements in source media nodes and receiving media elements in destination media nodes; creating a first set of pairs of the transmitting media elements and the receiving media elements; providing a stream of the multimedia data to at least one pair from the first set of pairs; adding a second set of pairs without affecting the first set of pairs; reconfiguring the multimedia system to provide the stream to at least one pair from the second set of pairs; creating a third set of pairs including transmitting media elements from the first set of pairs and receiving media elements from the second set of pairs or including receiving media elements from the first set of pairs and transmitting media elements from the second set of pairs; and reconfiguring the multimedia system to provide the stream to at least one pair from the third set of pairs.

The system of the present embodiment for supplying a stream of multimedia data can include, but is not limited to including, at least one media node configured with at least one receiving media element or at least one transmitting media element or both; a first set of pairs of the transmitting media elements and the receiving media elements; a second set of pairs of the transmitting media elements and the receiving media elements; a third set of pairs including the transmitting media elements from the first set of pairs and the receiving media elements from the second set of pairs; and a common management layer (CML) configured to configure the transmitting media elements and the receiving media elements; create the first set of pairs; configure the stream of the multimedia data to be provided to at least one of the first set of pairs; create and add the second set of pairs without affecting the first set of pairs; reconfigures the stream to be provided to the second set of pairs; create the third set of pairs; and reconfigure the stream to be provided to the third set of pairs.

For a better understanding of the present embodiment, together with other and further objects thereof, reference is made to the accompanying drawings and detailed description.

DESCRIPTION OF THE SEVERAL VIEWS OF THE DRAWING

FIG. 6 depicts configuration tables used by the common management layer for a first configuration.

DETAILED DESCRIPTION

Figure 1:
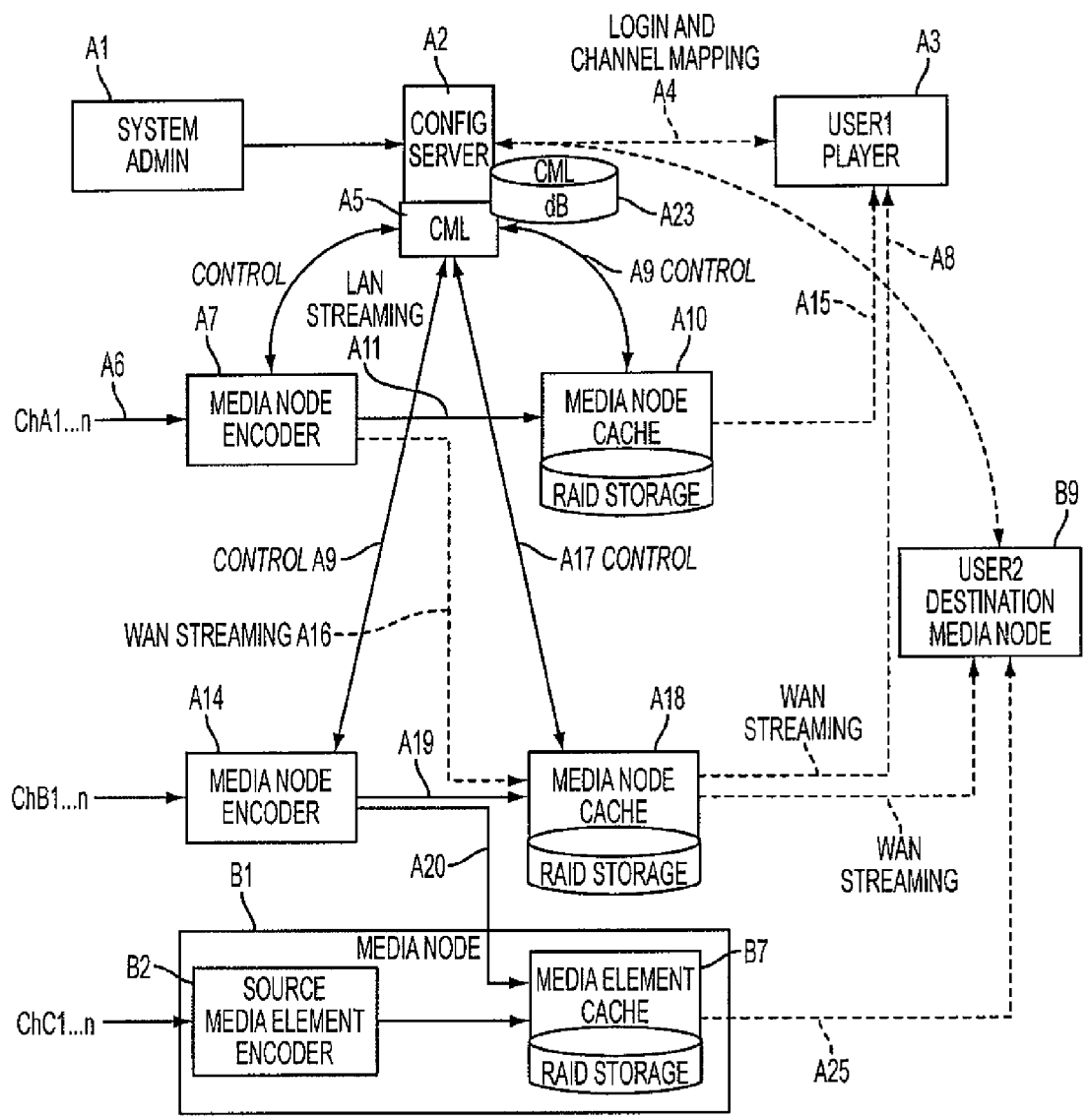
FIG. 1 is a schematic block diagram of an illustrative embodiment of the system including media elements and several source channels.

The present embodiment is now described more fully hereinafter with reference to the accompanying drawings. The following configuration description is presented for illustrative purposes only. Any computer configuration and architecture satisfying the interface requirements herein described may be suitable for implementing the system and method of the present embodiment.

In the following description, certain terms are defined as follows.

Media elements (MEs) can include video recording storage and playback channels, video encoder modules, a video streamer, closed caption processing, high density storage interface, and facial recognition processing modules. A media element (ME) in conjunction with transmitter and receiver modules can, for example, stream video over LAN or WAN networks and can interconnect with other MEs or with a media node (MN) through communications networks. A ME can include, but is not limited to including, a ME channel interface (MECH), a media element transmitting/sourcing block interface (METX), and a (MERX). TX and RX refer to transmitter and receiver interfaces respectively. Transmitting media elements are configured to receive, process, and store multimedia data from a source of multimedia data, and transmit the multimedia data (perhaps processed) to receiving media elements. Receiving media elements are configured to receive multimedia data from transmitting media elements, and, for example, play those data to a user.

A media node (MN) can include, but is not limited to including one or more ME channels with media component functionality. A common management layer (CML) can, for example, configure and manage MNs and MEs, and can interconnect them with multimedia channels. A configuration server can, for example, configure and manage MNs and interconnect them. The system of the present embodiment can provide multimedia services over wide geographical area through the use of MNs and MEs orchestrated by the CML.

Cache storage (CS) can include, but is not limited to including, caching and/or storage for the multimedia content on storage device such as, for example, hard disk drive (HDD), redundant array of inexpensive drives (RAID) Array, or random access memory (RAM). Multimedia content can include, but is not limited to including audio, video, and closed caption.

A media controller (MC) can manage MN-related functions, can execute job sequences, and can create MEs, Listeners, and other MN modules. A listener can listen at each network boundary for peer MN job requests to create source ME modules on the MN, where the source ME modules can connect to the peer destination MN MEs.

The system of the present embodiment can be adaptable to various geographic, network and performance requirements providing multimedia data and services to plurality of users comprising of a plurality of MNs, for example, with one MN per server, MNs having the ability to receive jobs from a CML or from a peer MN and to create one or more MEs with media component characteristics to process multimedia data. The ME can request and use mapping from the CML through its MN to a peer sourcing MN for its ME which has the required media resources. The system of the present embodiment can process numerous multimedia channels dispersed over wide geographical areas, record multimedia content continuously for long periods of time, enable numerous users from wide geographical areas to have simultaneous playback access, stream video between nodes, to storage and to users, enable multiple video/audio interfaces such as, for example, National Television System Committee (NTSC), satellite, cable, broadcast networks through its encoder input interface, and enable various video/audio formats including high definition and radio frequency (RF).

The system of the present embodiment can accommodate multimedia processing functions such as, for example, special media elements, hierarchical storage management of long term storage, transcoding i.e. converting between different standards such as converting between different streaming bit rates, closed-caption-based clip search processing, clip extraction from storage to local PC, facial and object video recognition, and audio recognition.

The characteristics of the system of the present embodiment can be modified without the need to restart the MNs because MECH, METX, MERX, TX, RX are used in a way that allows such modifications, and because the MC and the Listener can create and configure MEs, Transmitters and receivers can perform message exchange in response to receiving jobs from the CML or from the MNs.

In order to enable the capabilities of the system of the present embodiment, new MEs can be created and interconnected dynamically. In addition, MEs can be brought into the system and taken out of the system without restarting the system. The following steps can be taken to initiate a stream of the multimedia data from a source media controller to a destination media controller through the use of interconnecting MEs and changing the interconnections dynamically.

Actions by a destination media controller:
  if a MECH module exists, configure it to provide processing and storage for a channel;
    otherwise create a MECH module; and
    create a receiver module RX.

Actions by destination MECH:
  create a MERX module for the channel; and
  associate the MECH module with RX.

Actions by destination media controller:
  send a connect command to RX wherein the connect command can include, but is not limited to including, METX, a type, the channel, certificate information.

Actions by destination RX:
  send a message to a source listener sink to connect;
  send a message containing METX, the type, the channel, and certificate information; and
  send a message to a source listener including, but not limited to including, a suggested transmission protocol, or a query to determine the transmission protocol.

Source listener sink:
  acknowledge to a destination RX wherein the acknowledgement can include, but is not limited to including, METX, the type and certificate information;
  request a source media controller to authorize the peer MN;
  create a local transmitter TX with the requested protocol and a socket; and
  instruct the source media controller to create the MECH providing the type, channel, and user information.

Source media controller:
  create the MECH if necessary with MECH, type, and channel information.

Source MECH:
  create the METX.

Source METX:
  associate the METX with a TX module.

Listener sink:
  command the TX run.

Source TX:
  reply to the destination RX with an agreed-upon protocol.

Destination RX:
  send the agreed-upon protocol to a local MERX of the destination MN and
  send a connected message to the local MERX.

Destination RX:
  send an onconnected message to a peer through a media controller of the destination RX.

Destination media controller:
  create a destination streaming session; and
  advise a peer media controller that TX and METX are connected.

Source TX:
  send an onconnected message to the peer through a media controller of the source TX.

Source media controller:
  create a source streaming session; and
  advise the peer media controller that TX and METX are connected.

The following components can execute, but are not limited to executing, repeating the following steps to implement the step of streaming data while the source is connected and the session is active:

Source media controller:
  deliver a sample from the METX source to the TX module; and
  stream the multimedia data to the destination media node RX.

Destination RX:
  deliver the sample to the destination MERX.

The following components can execute, but are not limited to executing, the following steps to implement the step of disconnecting the source deactivating the session:

By either the RX or the TX:
    detect a disconnect from the network or the RX of destination MN or TX of source MN; and
    send an ondisconnect message to either the MERX and the destination MN or the METX and the source MN.

By either the source or destination MN
    terminate the session.

The system of the present embodiment can span many types of networks such as Internet, wide area network (WAN), local area network (LAN), dedicated, and satellite. The MEs can be reconfigured to interconnect with other MEs inside the same MN, or MEs inside other MNs, without the need to restart the MNs. MNs and MEs can be added or taken away, and the MNs and MEs can be redundant to implement fault tolerance. The system can include configuration maps that can be modified while the MNs and MEs are executing, and the new configurations reflected in the configuration maps can take affect without restarting the MNs. The ME can act as an encoder; a cache and a media player; and can also provide for hierarchical storage management of long term storage; trans-coding to provide conversions such as, for example, conversions between different streaming bit rates; processing closed caption-based clip searches, extracting clips from storage and providing them to a local user; and recognizing audio; and facial and object video. The system can allow for numerous multimedia channels dispersed over wide geographical areas and can record multimedia content continuously for long periods of time.

ME, transmitter, and receiver modules can be implemented with characteristics to provide media component functionality and stream traversal over many types of networks, but ME, transmitter, and receiver interfaces are generic between different types of MEs to facilitate standard control through the CML independent of the type of ME used.

Referring now to FIG. 1, the system of the present embodiment can include a plurality of video input channels ChA1 . . . n, MN Encoder A7, and MN Cache Storage A10, which can be geographically dispersed from plurality of channels ChB1 . . . n, MN with Encoder and Cache Media Elements A14. Cache Storage A10, composed of RAID Storage, can record video channel groups ChA1 . . . n and ChB1 . . . n continuously for an extended period of time. The system can enable a plurality of users from wide geographical areas to have simultaneous playback access. User1 A3 and destination media node B1 hosting User2 can be geographically dispersed from each other yet have simultaneous playback access to streaming video from Cache Storage A18. An example of streaming between nodes is depicted between MN A7 and MN A10 spanning LAN network medium A11 and between MNs A14 and A18 crossing another LAN network boundary A19. An example of spanning WAN Network A16 between MNs A7 and A18 is also shown. Spanning network between storage and user is shown between MN Cache storage A10 and Media Player for User1 A3 spanning WAN network A15. As shown, the system of the present embodiment is modular, even as it can include necessary multimedia components such as video and audio interface hardware for multiple channels, video encoders, cache storage, video streamers, long term storage, closed caption processing, video storage, video recognition, and many others, and considering that the system can continuously record from various sources and interfaces such as NTSC, Satellite, Cable, Broadcast Networks, security systems and other multimedia sources for extended time periods. MNs can be concentrated at specific locations or distributed over large geographical area to optimize performance and conserve system or network resources in order to record and serve multimedia content to, for example, an interne or intranet user. An MN can be fully housed in a single server. MN connections can be orchestrated by CML A5, hence, system administrator A1 can bring, for example, MN ME Cache A18 additional ME channels into the system without the need to restart the current MNs, such as MN Encoder A7 and Media Player A3. Thus, if one cache fails, CML A5 can associate, for example, MN Encoder A7 with an alternative cache ME. In cases where the system needs to be expanded, additional MNs could be installed and connected through CML A5 and could then communicate with the current MNs. Termination requests can be executed by CML A5 to terminate any kind of an active job. During playback, media player channels can be mapped automatically through CML A5. Configuration server A2 need not be a separate machine, any server with sufficient additional bandwidth and database storage can be used. For this purpose, system administrator A1 can map CML dB A23 with MNs and channels available for different users. During initial user login, user workstation loads the media player, which interfaces with the MNs and MEs, of the present embodiment from the configuration server A2. Then during playback, when User1 selects video channels in media node player A3, video can be streamed directly to media node player A3 from the right MN and channel. CML A5 and System Administrator A1 can change configuration maps because CML DB A23 can store the configuration map of the network, an example of which is illustrated in FIG. 6. Each user can have an assigned configuration map.

Continuing to refer to FIG. 1, User2 at destination media node B9 can monitor and play back recorded channels ChB1 . . . n through MN Encoder A14, and Cache Storage A18. MNs A14 and A18 are illustratively shown with one ME each. MN B1, on the other hand, is illustratively shown with two MEs, ME Encoder B2 and ME Cache B7. A ME is the main processing and or storage block of the system of the present embodiment. During reconfiguration, User2 at destination media node B9 can monitor and play back recorded channels ChB1 . . . n through MN Encoder A14 and Cache Storage A18. When there is a problem with MN Encoder A14, for example, partial ME Cache portion B7 of Media Node B7 can be dedicated for a backup function. Examples of streaming between MN A7 and MN A10 spanning LAN network A11 and between MN A14 and MN A18 spanning LAN network A19 are shown.

Continuing to still further refer to FIG. 1, when there is a need to increase the capacity of the system, such as an increase the number of video channels being monitored or an increase the amount of media storage, video encoders and cache servers can be added. For example, if User2 at destination media node B1 is configured with ChB1 . . . n media channels available for monitoring and recording with the corresponding MN Encoder B2 and MN Cache B7, and if User2 needs increased capacity, i.e. with additional media channels ChC1 . . . n to be monitored and recorded, ME Encoder B2 and ME Cache B7, both part of MN B1 can be added, and control link A25 can be configured, and a configuration map such as the one depicted in FIG. 6, of this configuration can be stored in CML dB A23. This can make the additional channels available to User2 or other users who can monitor these channels. User 2 can connect to a new channels ChC1 . . . n through ME Encoder B2 and ME Cache B7, and through streaming media WAN link A25. In addition, the system capacity can be increased without the need to restart the previously existing NMs.

Figure 2:
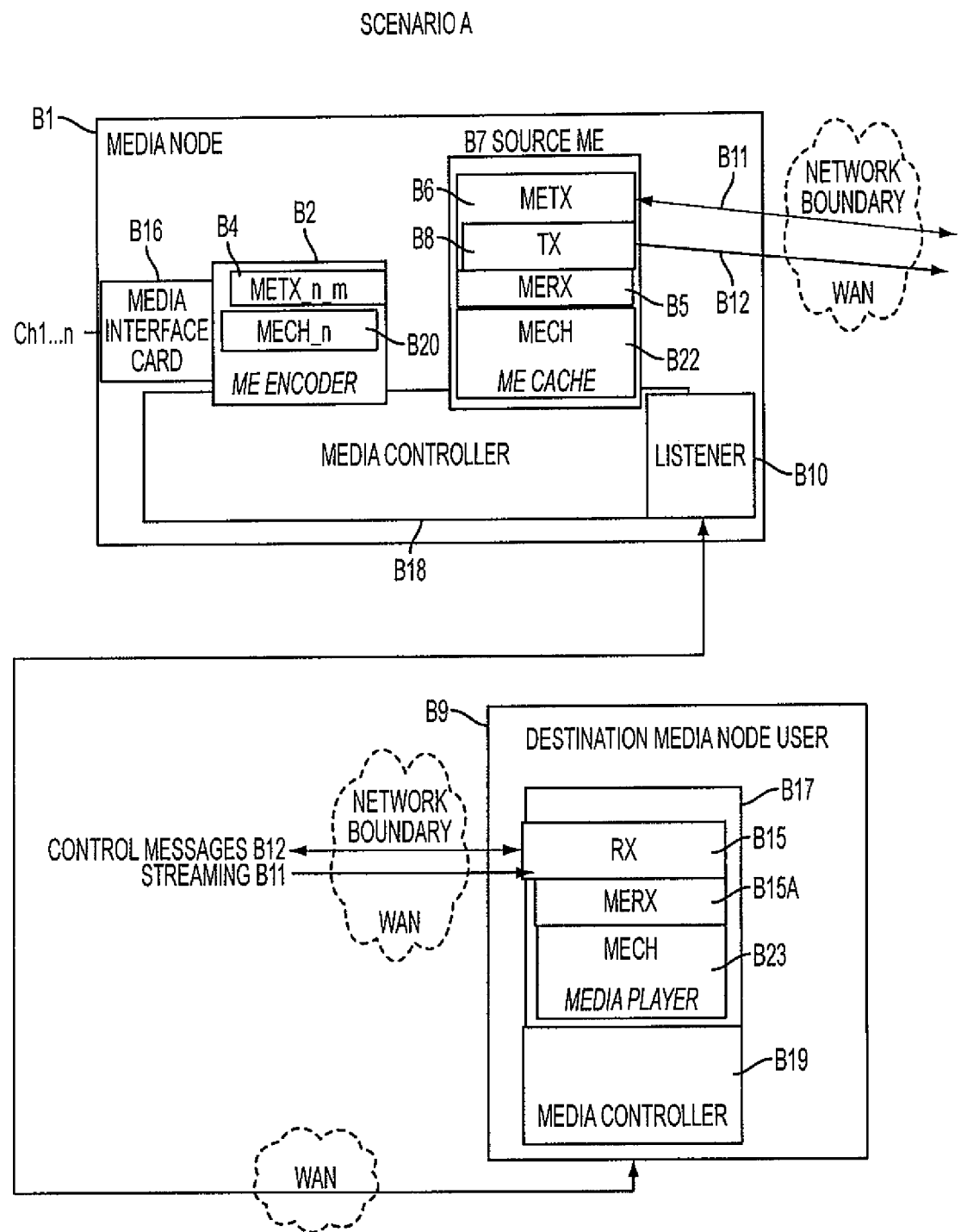
FIG. 2 is a schematic block diagram of an illustrative embodiment of the system when used under conditions of a scenario A.

Referring now primarily to FIG. 2, channels such as CHA1 . . . n (FIG. 1) can consist of streaming media flow path B11 and control messages flow path B12. A channel is a two-layer communication system used to connect two distinct ME modules having two connections per-channel: control message flow path B12 for runtime message delivery and a one-way streaming channel B11 for streaming the content. Streaming connection can be uni-directional, and hence, streaming transmitter B8 can deliver data to the Receiver Sink B15, which can enable future support of arbitrary protocols such as, for example, User Datagram Protocol (UDP)/Multicast. Control messages B12 can enable data delivery in both directions to enable runtime control of the data being transferred. Control codes are unique identifiers used to identify messages sent through the control message flow path. Each ME can support control codes that could take the form of a 64-bit integer divided into two parts: a 48-bit part could be of the form of, for example, a Media Access Control (MAC) address and a 16-bit part could be a control code. The 48-bit part could be any address as long all IDs for a specific ME are associated with the same address, for example, a MAC address. The size of a single control message can be measured without the size of the control code. Each control message post can be followed by a corresponding status notification message that can be sent from the peer to indicate whether the control message succeeded or failed. The 16-bit control code could be structured as follows:

```
struct ControlCode {
   struct Mask {
      QWORD MAC : 48;
      QWORD ID   : 16;
   };
   union {
      Mask     mask;
      QWORD    code;
   };
};
```

Control codes can be used for communicating between MEs that transact data; these control codes can be used to affect the way data are streamed from one ME to another. There can be a set of mandatory control codes that have a specific address, for example a MAC address of one, and can be required to be implemented by any ME module.
Code: 00 00 00 00 00 01|00 01
Description: StartStreaming
Parameters:
TIMESTAMP starttime (−1 for live streaming)
FLOAT rate (−1.0 for rewind 1.0 for playback, 2.0 for playback twice the normal speed, . . . )
Size: sizeof(TIMESTAMP)+sizeof(FLOAT)
Code: 00 00 00 00 00 01|00 02
Description: StopStreaming
Parameters: None
Size: 0
Code: 00 00 00 00 00 01|00 03
Description: StreamingStopped (usually called by the transmitter to report streaming termination for an abnormal reason)
Parameters: HRESULT Reason (HRESULT describing the reason for stopping the stream)
Size: sizeof(HRESULT)

Code: 00 00 00 00 00 01|00 04
Description: StatusNotification (used to report whether a control message was executed successfully and on occasional errors)
Parameters: QWORD ControlCode (the control code triggering this event or −1)
HRESULT Status (the Id of the error formatted as HRESULT)
UNICODE_STRING Message (the status message, UNICODE_STRING::Buffer points to (PBYTE)&usMessage+sizeof(usMessage))
Size: sizeof(QWORD)+sizeof(UNICODE_STRING)+sizeof(HRESULT)+usMessage.Length There can be optional control codes that can have, for example, a MAC address of zero and may not be required to be implemented by any ME module.
Code: 00 00 00 00 00 00|00 01
Description: PauseStreaming
Parameters: None
Size: 0
Code: 00 00 00 00 00 00|00 02
Description: ResumeStreaming
Parameters: None
Size: 0
Code: 00 00 00 00 00 00|00 03
Description: ChangeRate
Parameters: FLOAT rate (−1.0 for rewind 1.0 for playback, 2.0 for playback twice the normal speed, . . . )
Size: sizeof(FLOAT)
Code: 00 00 00 00 00 00|00 04
Description: Seek
Parameters: TIMESTAMP starttime (−1 for live streaming)
Size: sizeof(TIMESTAMP)
Code: 00 00 00 00 00 00|00 05
Description:

SelectStreams (selects which streams to deliver and which streams NOT to deliver, may be used to select different bit rates, different CCs or different languages)
Parameters:

WORD wStreamCount (the amount of streams to be configured) DWORD*pStreams (an array of DWORDs each representing a stream state, the LOW order WORD define the stream number and the HI order word resemble the state of the stream, this is 1—On, 2—Off, the Id of each stream is defined by the WMProfile object delivered through IInputChannelSink::OnFormatChange)
Size: sizeof(WORD)+sizeof(DWORD)*wStreamCount
Code: 00 00 00 00 00 00|00 06
Description:

PostDataSizeRequest (request the size of data representing the time span described through 'starttime' and 'endtime', the streams for which the size is calculated according are the active streams, potentially set by the SelectStreams control code.

this call result a corresponding DataSizeResponce message upon success and a StatusNotification message upon failure)
Parameters: TIMESTAMP starttime
  TIMESTAMP endtime
Dependency: DataSizeResponce
Size: 2*sizeof(TIMESTAMP)

```
Code: 00 00 00 00 00 00 | 00 07
Description: DataSizeResponce
Parameters:
   TIMESTAMP  starttime
   TIMESTAMP  endtime
   QWORD      qwSizeInBytes
Dependency: PostDataSizeRequest
Size: 2 * sizeof(TIMESTAMP) + sizeof(QWORD)
```

Figure 7:
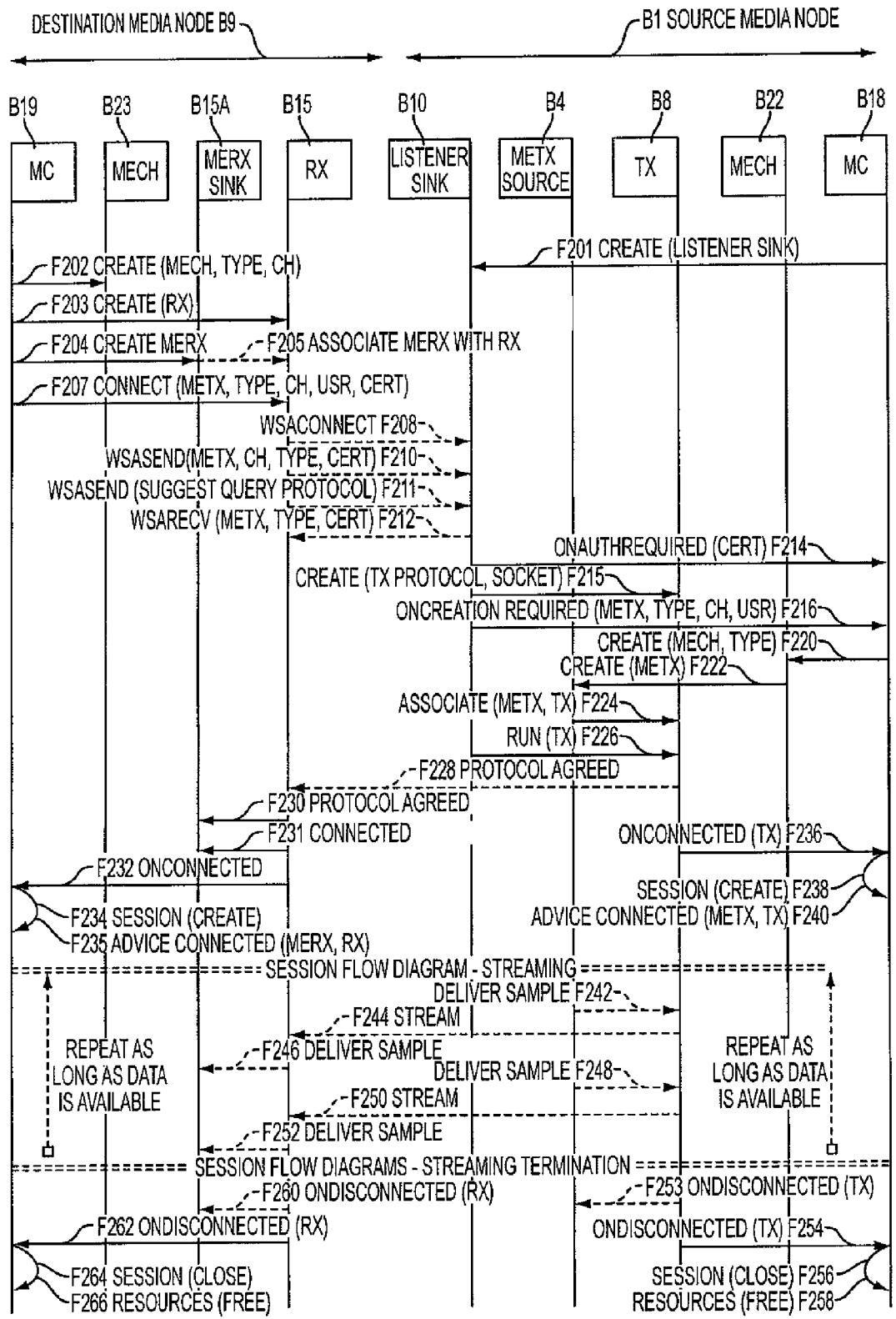
FIG. 7 is a flow diagram for session initiation, session streaming, and session termination.

Continuing to refer to FIG. 2, MN B1 is illustratively shown as a server having two MEs, Encoder B2, and Cache Storage B7, and MN B9 is illustratively shown as a server having single Media Element, Media Player B17. Different Video/Audio interfaces can be achieved by conventional video interface cards/setup-boxes such as Media Interface Card B16, illustratively that can be configured to receive transmissions from sources such as NTSC, satellite, and cable broadcast network in standard or high definition, and in conjunction with conventional drivers such as video drivers. The interfaces MECH, MERX, METX, RX, and TX can enable the system to be modular. MECH_n B20 and B22 are related to channels 1 . . . n of ChA1 . . . n. METX_n_m B4 and B6 illustrate ME Source and ME Sink processing modules. The n_m suffix denotes that these modules are related to both video input channels, Ch1 . . . n and users such as User_m at destination media node B9. ME modules and MECH_Interface B20 can receive control messages B12, such as, for example, messages used to extract configuration data from the ME and execute ME operations. METX_n_m B4 can be created by MN B1 and can stream data from ME B7 for example during streaming F244 (FIG. 7). METX_n_m B4 can mediate between two ME modules over many types of networks. Playback and streaming through the network can be done with the ME Cache B7 module in combination METX_n_m B6. Each ME receiving data can be equipped with a receiver unit such as MERX_n_m B5 through which recording of video streaming can be accomplished. A receiver MERX B5 can be created by MN B1 during connection initiation F203 (FIG. 12). MERX_n_m B5 can mediate between two ME modules over many different networks such as LAN A11 (FIG. 1) or WAN A16 (FIG. 1), or, in the absence of a network, interprocess communication, between METX_n_m B4 and MERX_n_m B5. Since MEs can be interconnected with each other inside of the same MN or with other external MNs, the system of the present embodiment can accommodate dynamic reconfiguration. Examples of streaming between MNs B1 and B9, between MEs B7, between source module METX B6 and sink module MERX B15 spanning WAN Network B12 are shown. Just by changing the TX Plug-in D08 (FIG. 5) or RX Plug-ins D09 (FIG. 5), MEs can span many types of network barriers. Scenario A illustrates MN B1, which contains ME Encoder B2 and ME Cache B7, and MN B9, which contains ME Media Player B17. As example of a connection inside MN B1 which does not need to span a network boundary, information is being transferred from METX_n_m B4 to MERX_n_m B5. In this case, the transaction is executed using a Null connection, that is, a TX/RX pair is used for interprocess communications since both are contained within the same MN B1. Consuming data from ME Cache B7 is MERX_n B15 of ME Media Player B17. MN B1 components can include software methods and services used for such services as coordinating control with CML A5 (FIG. 1), and creating and configuring ME modules. MN B1 services can include, but are not limited to including, services such as those provided by, for example, Media Controller B18 and Listener B10. When User2 of MN B9 needs to play recordings, user2 can contact Listener B10 through a WAN. Listener B10 can be a "server-side" module that can accept incoming connection requests, hence, a reception session creation can trigger a connection to be accepted by a peer Listener and the corresponding METX_n_n_m B6 to be created. MC B18 is the main module of MN B1, and can perform the following functions: (1) periodic state reporting to the CML, such as still-alive messages; (2) creating ME interfaces MECH, METX, MERX and TX, RX; (3) creating communication accessories such as, for example, Listener B10; and (4) orchestrating job transactions and execution. Authentication is used to prevent un-authorized access, each MN module can authenticate connections to other MN modules and connections to the CML.

Figure 3:
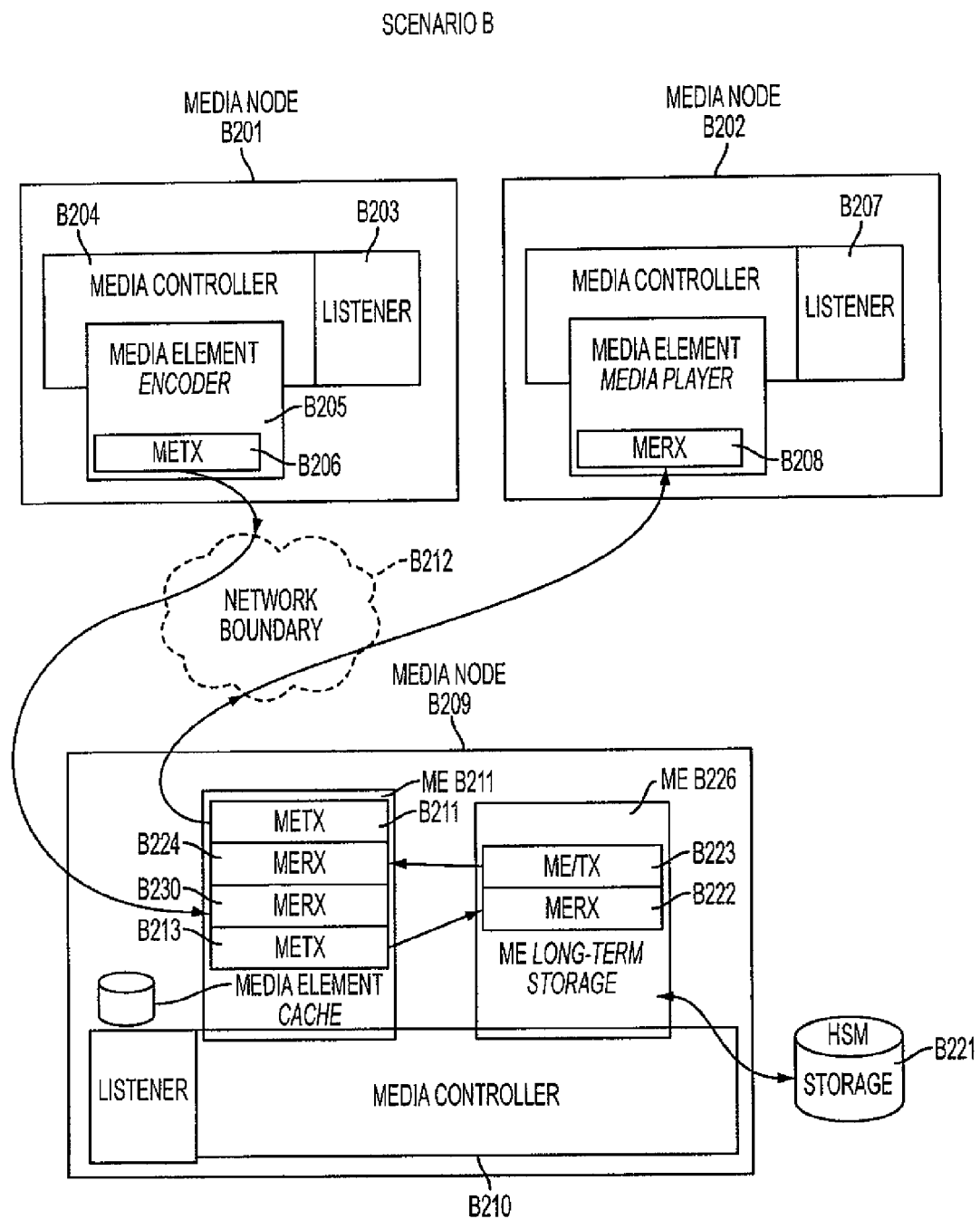
FIG. 3 is a schematic block diagram of an illustrative embodiment of the system when used under conditions of a scenario B.

Referring now to FIG. 3, Scenario B is similar to scenario A with two main differences: (1) MN Encoder B205 is the only ME in MN B201, and MN Encoder B205 uses METX B206 with a TCP Transmitter to communicate with MN Cache B209, which is using MERX B230 with a TCP Receiver; and (2) there is an additional ME Long-term Storage B226 sharing MN B209. ME Long-term Storage B226 can use Hierarchical Storage Management (HSM) storage B221. This ME is connected through a local Null connection MERX B222 to extract data from ME Cache METX B213 for ME Long-term Storage B226. Each ME can manage a local store of metadata describing streaming information such as, for example, channel and streaming times, and these data can be periodically stored to support disaster recovery. Also, the main SQL DB can store metadata describing which data are stored where to enable data requests to be properly directed. Consuming data that was stored for long-term can be executed directly on the ME Long-term storage B220, for example.

Figure 4:
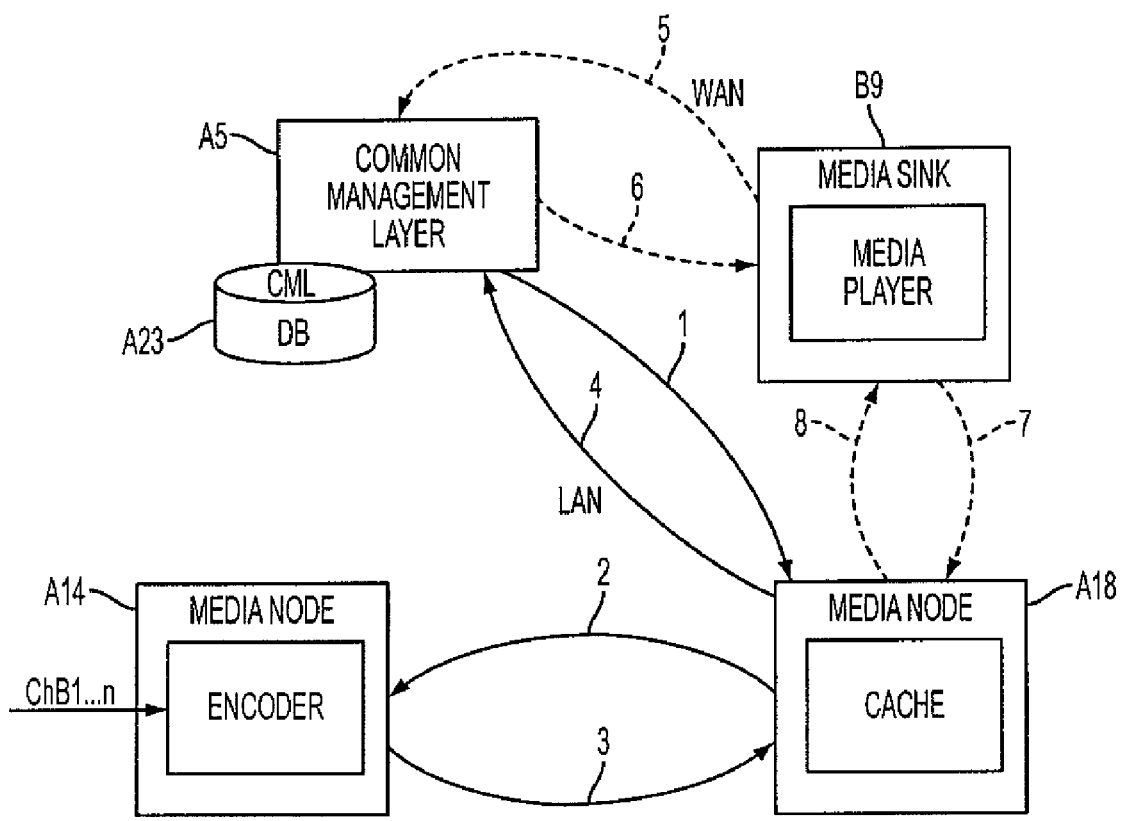
FIG. 4 is a state diagram depicting an interaction between the media nodes and a common management layer depicting job execution to configure, interconnect, and use media elements.

Referring now primarily to FIG. 4, CML A5 and MN operation during ME creation and configuration are illustrated. MN connections are orchestrated by CML A5, hence, an administrator A1 (FIG. 1) can bring a MN into the system without the need to restart the current MNs, such as MN Encoder A14 and MN Cache A18. Thus, if MN Encoder A14 fails, CML A5 can associate MN Cache A18 with an alternative encoding node. In cases where the system needs to be expanded, additional MNs could be installed and connected through CML A5 and could then communicate with the current MNs. Termination requests can be executed by CML A5 to terminate any kind of an active job. During playback, media player channels can be mapped automatically through the CML. Operationally, CML A5 can execute (state 1) a data archiving job on the MN Cache A18 by performing the following steps. MN Cache A18 can allocate its resources such as a receiver and storage to record a channel, and can query (state 2) the MN Encoder A14 whether it can transmit the required video stream with broadcast currently being received on one of the specified channels of ChA1 . . . n. MN Encoder A14 can transmit (state 3) stream video to MN Cache A18. At this point, a session is successfully created with MN Encoder A14 module, and data are being received and archived; CML A5 is notified (state 4) that job execution was successfully started. The following steps can implement playback. Media Player at destination source node B9 can begin execution of a playback job on CML A5, by asking (state 5) for recorded data on a specific channel such as ChA1 CML A5 can return channel allocation and mapping (state 6), and can direct Media Player at destination source node B9 to MN Cache A18, channel ChA1. Media Player at destination source node B9 can allocate resources and execute a playback job on MN Cache A18 at ChA1. Media Player at destination source node B9 can control (state 7) the cache storage of ChA1 directly through LAN or WAN link. At this point, a session has been successfully created and the desired data are being transmitted, streamed (state 8) to Media Player at destination source node B9.

Figure 5:
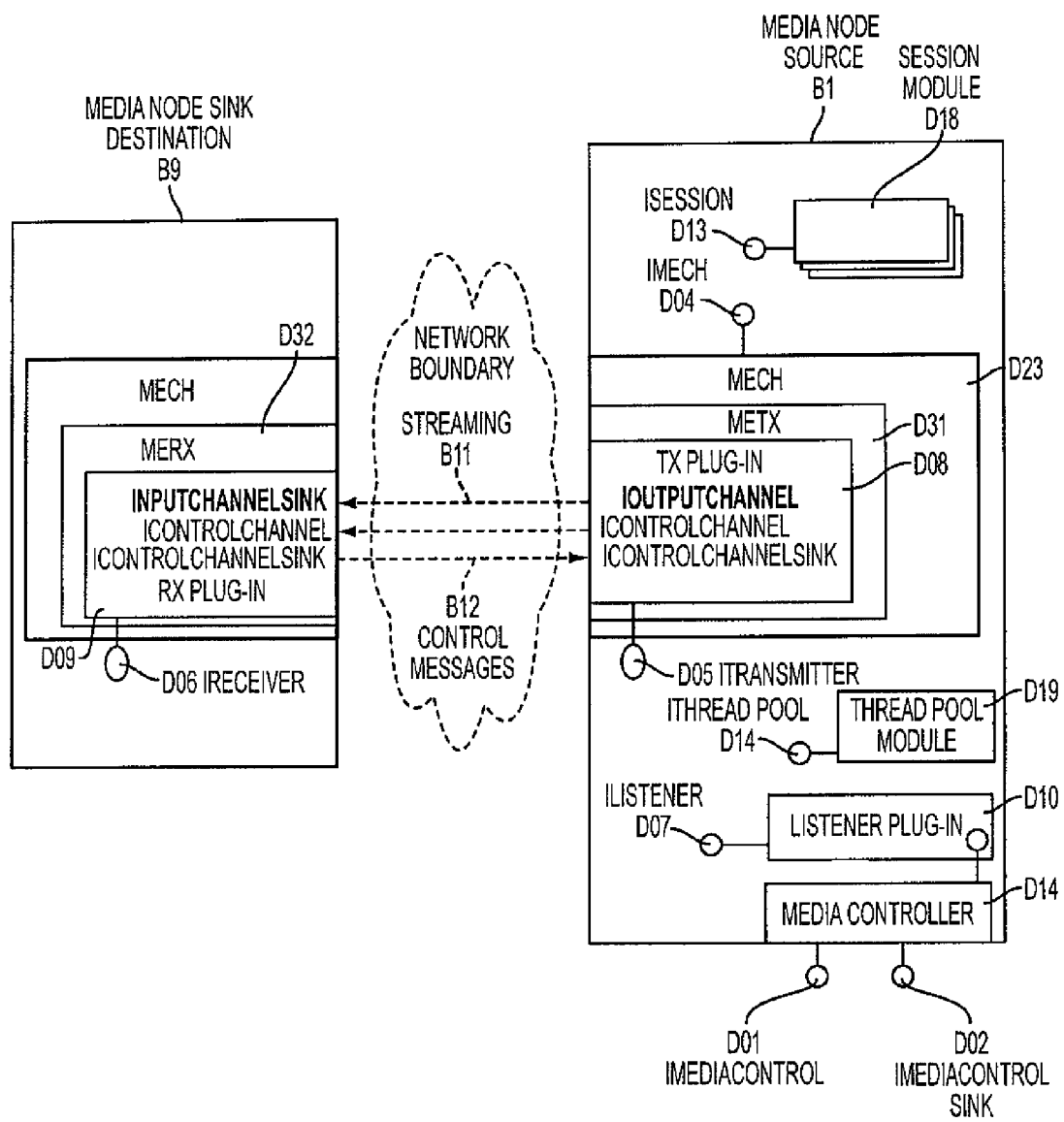
FIG. 5 is a schematic block diagram of an illustrative embodiment of media node control modules and interfaces.

Referring now to FIG. 5, MN B1 is shown performing control functions of ME modules. Interfaces implemented by each module and access to the interfaces are illustrated. Session module D18 can maintain the state of an active data transfer connection with an associated task. Transmitter module TX Plug-in D08 can be used by MN Source D34 as a proxy mediating with receiver RX Plug-in D09 over a network boundary; TX Plug-in D08 can be used to push data to MERX D32 through ITransmitter D05, and IOutputChannel and IControlChannel interfaces. Receiver RX Plug-in D09 can receive data from a METX D31 across the network boundary. In a TCP/IP implementation, for example, RX Plug-in D09 can act as a stub for streaming data generated by METX D31. Media Controller D14 can create RX Plug-in D09 and instruct it to connect to a streaming source for data reception, which can cause Transmitter Plug-in D08 to be created on the peer side. The data transfer can start after METX D31 is connected to MERX D32. IRecevier interface D06 can be described as follows:
HRESULT Initialize(IN IUnknown*pThreadPool, IN IUnknown*pLogger)

Used to initialize MERX D32 and associate it with the Media Node framework (ThreadPool module D19 and the Logger modules).
HRESULT Connect(IN IP*pIP, IN GUID guidMECHType,
   IN PBYTE pbtMETX, IN DWORD dwMETXSize,
   IN PBYTE pbtCertificate, IN DWORD dwCertificateSize,
   IN CASyncResult*pCallback)

Connect the receiver MECH to the remote transmitter specified by 'pIP' and 'pbtMETX', 'pbtMETX', specify MECH custom information regarding the way it should be configured, hence, it may be used to setup the peer MECH D23 to transmit channel X.

To enable authorized access, a certificate identifying the 'user' can be sent, the certificate information is specified by 'pbtCertificate', and 'dwCertificateSize'.

Successful connection will trigger 'pCallback'.
HRESULT Disconnect(IN CASyncResult*pCallback)

Disconnect the active connection and trigger 'pCallback' upon completion.

Continuing to refer to FIG. 5, Listener Plug-in D10 can accept and authenticate incoming data transfer requests. On each new connection request MERX D32 can be authenticated using the provided certificate, and a successful authentication can result in the creation of METX D31 and associating it with ME D24. Destination MN B9 registration can be done externally by authorizing new connection requests and creating ME D24 modules. For each type of boundary, a corresponding Listener Plug-in D10 can be implemented with corresponding MERX D32 and METX D31. MERX D32 can resemble a data destination, i.e. a place that data is being archived to. An encoder—cache server session can include a cache sink receiving data from an encoder. MERX D32 can be created by a ME module, and can implement the MN. MN Source B1 can resemble a source of data, hence, an encoder—cache server session can include MN Source B1 for generating the encoder data. METX D31 can be created by an ME module, can resemble a source of data, and can implement IControlChannelSink interface and an IConnectionSink interface. MECH D23 is a media processing and storage unit common to a whole channel to support receiving and transmitting data. MECH 23 can create media source and media sink modules on a per-connection basis; hence, one ME module may have a collection of media source and media sink modules associated with it. MECH D23 can also support receiving control messages such as, for example, messages used to extract configuration data from the ME and execute ME-specific operations. MECH D23 can implement IMECH interface D04. IMECH interface D04 can be described as follows.
HRESULT Initialize(IN IUnknown*pThreadPool, IN IUnknown*pLogger)
HRESULT CreateSource(IN ITransmitter*pChannel,
   IN PBYIE pbtMETX, IN DWORD dwMETXSize,
   OUT IMETX**ppMETX)

Creates a METX module D31, associates it with the OutputChannel specified by 'pChannel' and connects to the associated control channel sink.

The 'pbtMETX' parameter is used to deliver MECH proprietary configuration information such as Channel Id, Channel Name, override . . .
HRESULT CreateSink(IN IReceiver*pChannel,
   IN PBYTE pbtMETX, IN DWORD dwMETXSize,
   OUT IMERX**ppMERX)

Creates a MERX module D32, associates it with the InputChannel provided by 'pChannel' and registers with IInputChannelSink and IControlChannelSink.

The 'pbtMETX' parameter is used to deliver MECH proprietary configuration information such as Channel Id or Channel Name, override . . .
HRESULT get_ControlChannel (IN OUT IMECHControl**ppChannel)

This method is called by Media Controller D14 to get the interface point of the control channel of the MECH, the control channel is used to execute MECH specific operations such as span deletion and supported channels query.

Referring now primarily to FIG. 6, in case of failure of MN Cache A10 (FIG. 1), there is another set of configuration tables for User1 where instead of MN Cache A10 (FIG. 1), User1 is mapped with ME Cache A18 (FIG. 1) as illustrated in FIG. 6. Setting up two sets of configuration maps, in case of problems with networks A11 (FIG. 1) or A15 (FIG. 1) or problems with MN A10 (FIG. 1), Systems Administrator A1 (FIG. 1) can switch to network WAN link A16 (FIG. 1) and to ME A18 (FIG. 1) by pointing CML A5 to configuration maps as illustrated in FIG. 6. Fault tolerance redundancy can be accomplished by configuring a comprehensive set of configuration maps for N+1 redundancy by expanding on what is illustrated in FIG. 6. For example, if a group of four channels is configured into the system, and if there are two users, the system would need four configuration tables to achieve N+1 redundancy.

Referring now to FIG. 7, a session flow diagram outline— Session Initiation, Session Streaming and Termination—is depicted. During source media node configuration, for each type of network boundary, a source MC B18 can create F201 a corresponding listener B10 with matching receiver RX B15 and transmitter TX B8 modules. Session initiation can be started with a destination MC B19 creating F202 destination MECH module B23 which can provide processing and storage for a channel of interest if the module does not yet exist. In addition destination MC B19 can provide information regarding the type of MECH, depending on the type of ME that is needed, such as, for example, media player, and a channel of interest. Otherwise existing MECH B23 for this channel can be used. The destination MC B19 can further create F203 a receiver RX B15. The MECH B23 can create F205 an additional MERX module B15A for the channel and the destination MN user, and associate it with the RX B15. The destination MC B19 can request connection F207 through the RX B15 by specifying METX B4, type, channel, user, and certificate for authentication. This information can be relayed F208, F210 by the RX B15 to the corresponding listener sink at listener B10. A protocol can be suggested F211 and if not matching, a suggestion can be queried from the peer transmitter TX B8. The listener sink of the listener B10 in the source MN B1 can acknowledge F212 the receipt of METX B4, MECH Type, and certificate. The listener sink of the listener B10 can request authorization F214 from source MC B1 to authorize incoming connections.

Continuing to refer to FIG. 7, the listener sink of the listener B10 can create F215 transmitter TX B8 of the right protocol and socket. The listener sink of the listener B10 can inform the source MC B1 that it requires F216 a METX B4, type, channel, and user with channel creation. After successful authentication called by the listener B10 on the source Media Controller B18 to create a new MECH module B22, the created MECH B22 is associated with channel. The source MC B18 can create F220 MECH B22 for the type if need be. The MECH B22 can create F222 METX B4 with channel and user information from step F216. The METX B4 can associate F224 the TX B8 with its own METX B4 source module. The listener sink of the listener B10 can command F226 the TX B8 to start running. Assuming the TX B8 agreed to the suggested protocol, the TX B8 can send F228 a reply with agreed-upon protocol to the destination RX B15. The reply is used to accept the protocol suggested by query; however if the protocol is not agreed upon, the connection can be terminated or a corresponding query can be executed to suggest an alternative protocol. After the protocol is agreed upon, an OnConnected message is sent F236 to the source MC B18 of the TX B8. The source MC B18 can create F238 a connected session and report F240 the connection with an advice connected message. Likewise, the destination RX B15 can receive F228 an agreed-upon protocol from the peer TX B8 which it can relay F230 to the RX MERX B15A, can send F231 a connected message to the RX MERX B15A. The destination RX B15 can inform F232 the destination MC B19 of the status of the procedure. The destination MC B9 can create F234 a connected session, and can report F235 the connection with an advice connected message.

Continuing to refer to FIG. 7, a streaming session can consist of delivering F242 a sample from the METX source B4 to the TX B8 module of the source MC B18 and streaming F244 the data to destination RX B 15. Then the sample is delivered F246 to the destination MERX B15A. This method is used to 'transmit' a single sample to the peer; upon successful delivery of the sample (i.e. addition to the TCP stack and not reception at the Peer side) a callback can be triggered. This process can be repeated (e.g. F248, F250, and F252) as long as the streaming session is active. A streaming termination session can start when either the RX B15 or the TX B8 detects a disconnect F253 from the network or its MN, and then signals F260, F254 an OnDisconnect to its MERX B15A or METX B4, respectively, and signals F262 and F254 to the destination MC B19 and the Source MC B18, respectively. The respective MNs can terminate F264, F256 their sessions and free F266, F256 their resources.

Certain interfaces referred to in the drawings are described as follows.

IListener interface D07 (FIG. 5)
HRESULT Initialize(IN IUnknown*pThreadPool, IN IUnknown*pLogger)

Used to initialize the listener F5, associate it with the Media Node framework (the ThreadPool and the Logger modules)

Sink registration is done externally by calling Advise, this enables authorizing new connection requests and for creating the adequate MECH F2 modules.
IListenerSink interface
HRESULT OnAuthorizationRequired(IN
   IListener*pListener,
   IN PBYTE pbtCertificate,
   IN DWORD dwSertSize,
   OUT VARIANT_BOOL**bAccessGranted)

This method is called by the listener F5 on the Media Controller F9 to authorize incoming connections, the authorization response is returned through '*bAccessGranted'.
HRESULT OnMETXCreationRequired(IN
   IListener*pListener,
   IN IOutputChannel*pTransmitter,
   IN GUID guidMECHType,
   IN PBYTE pbtMETX,
   IN DWORD dwDataSourecSize,
   OUT IMETX**ppMETX)

After successful authentication called by the listener F5 on the Media Controller F9 to create a new MECH module F8, the created MECH F8 is associated with 'pChannel' and then returned through '*ppMETX'.
ITransmitter interface D05 (FIG. 5)
HRESULT Initialize(IN IUnknown*pThreadPool, IN IUnknown*pLogger)

Used to initialize the transmitter F7 and associate it with the Media Node framework (ThreadPool and the Logger modules).
HRESULT Run( )

Called by the listener F5 upon connection initiation, extract the receiver protocol from the socket (or a different communication entity) and call IControlChannelSink::OnQueryProtocol on the METX module F6.
HRESULT Disconnect(IN CASyncResult*pCallback)

Disconnect the active connection and trigger 'pCallback' upon completion.
IMultiplexerSink interface
HRESULT OnReadSample(IN WORD wStreamNum, IN QWORD qwLastTime,
   IN OUT IMediaSample*pSample)

Called by the multiplexer on the METX module F6 to 'read' the next sample, of the stream specified by 'wStreamNum', 'qwLastTime' specify the time at which the last sample was ended, 'pSample' is a sample object allocated by the multiplexer to be filled by the METX module F6.
IChannelSink interface
HRESULT OnState(IN DWORD dwState, IN DWORD dwExDataSize,
   IN PBYTE pbtExData)

Used to report of a change in the channel state (such as 'streaming started', 'streaming stopped', 'format change', . . . )
IInputChannelSink interface This interface inherits from IChannelSink.
HRESULT OnSampleDelivery(IN WORD wStreamNum, QWORD cnsSampleTime, IN QWORD cnsSampleDuration, DWORD dwFlags,
    IN INSSBuffer*pSample, IN INT64 i64Context)

This method is called by the receiver F3 to report that a new sample was successfully read, 'i64Context' is set to the context value set through 'pdwContext' variable of OnGetBufferForDeliver.

HRESULT OnGetBufferForDelivery(IN WORD wStreamNum,
    IN DWORD dwReqSize,
    IN OUT INSSBuffer**ppSample,
    OUT INT64*pdwContext)

Called to get a buffer to be filled with new sample data, 'dwReqSize' resembles the size of the buffer needed and 'wStreamNum' resembles the stream receiving the sample, '*pdwContext' can be used to store a context value that can be reported in a corresponding call to OnSampleDelivery HRESULT OnFormatChange(IN IWMProfile*pProfile)

This method is called to report a change in the format being streamed.

IChannel interface
HRESULT GetMETX(OUT GUID*pguidMECHType,
    OUT PBYTE pbtMETX,
    OUT PDWORD*pdwMETXSize)

Return the METX F6 that was used to initiate the connection, if '*pdwMETXSize' is set to zero the required size would be returned.

HRESULT                              get_ControlChannel(OUT IControlChannel**ppChannel)

Retrieve an interface to the control channel object.
IInputChannel interface

Inherits from the IChannel interface
HRESULT SuggestFormat(IN IUnknown**ppProfile)

Being called to agree or disagree a format

Used in conjuration with InputChannelSink::OnFormatChange to request a specific format to be delivered, if the format was changed by SetFormat and the format is not acceptable by the transmitter F7 an additional InputChannelSink::OnFormatChange can be triggered with the new suggested format, this process will continue until a format was agreed upon of the connection was dropped by either side.

IOutputChannel interface

Inherit from the IChannel interface
HRESUT DeliverSample(IN WORD wStreamNum, IN QWORD cnsSampleTime,
    IN QWORD cnsSampleDuration, IN DWORD dwFlags,
    IN INSSBuffer*pSample, IN CASyncResult*pCallback)

This method is used to 'transmit' a single sample to the peer, upon successful delivery of the sample (that is: addition to the TCP stack and not reception at the Peer side) 'pCallback' can be triggered.

HRESULT ChangeFormat(IN IWMProfile*pProfile)

Called to indicate the peer of a format change.
IControlChannel interface
HRESULT SendControlMessage(IN QWORD qwControlCode, IN PBYTE pbtData,
    IN DWORD dwSize, IN CASyncResult*pCallback)

Used to send control messages such as 'Play', 'Stop', 'Pause' and 'Resume', message specific data is specified through 'pbtData' and 'dwSize', upon successful transmittion of the message 'pCallback' can be triggered.

HRESULT QueryProtocol(IN WORD wControlCodesCount,
    IN QWORD*pqwControlCodes,
    IN CASyncResult*pCallback)

Used by the transmitter F7 to query the receiver F3 whether it supports a certain protocol, this method will result a call to IControlChannelSink::OnProtocolAgreed to indicate Acceptance of the desired protocol OR will require the receiver F3 to call 'QueryProtocol' on the transmitter F7 to agree on a different protocol.

HRESULT ProtocolAgreed(IN CASyncResult*pCallback)

Used to accept the protocol suggested by IControlChannelSink::OnQueryProtocol, however if the protocol is not agreed the connection can be terminated or a corresponding call to QueryProtocol can be executed to suggest an alternative protocol.

IControlChannelSink interface
HRESULT OnControlMessage(IN QWORD qwControlCode, IN PBYTE pbtData,
    IN DWORD dwSize)

Asynchronously called by the control channel to report delivery of a new control messages.

HRESULT OnQueryProtocol (IN WORD wControlCodesCount,
    IN QWORD*pqwControlCodes)

First called by the receiver F4 to agree on the communication protocol with the transmitter F7, if the protocol is acceptable a corresponding call to IControlChannel::ProtocolAgreed will be executed, else, the receiver F4 could terminate the connection or could suggest an alternative protocol by calling IControlChannel::QueryProtocol on the transmitter F7.

HRESULT OnProtocolAgreed ( )

Indicate that the protocol queried was accepted by the peer.

Returning failure can cause the transmitter F7/receiver F4 to terminate the connection.
IConnectionSink interface
HRESULT OnConnected(IUnknown*pSource)

Report called by 'pSource' (the receiver or transmitter) upon successful connection.

HRESULT OnDisconnected(IUnknown*pSource)

Report called by 'pSource' (the receiver or transmitter) upon disconnection.

Following are the interfaces exposed by the MC to the external world. These interfaces can be used by the CML to instruct the MC to take certain actions and to receive asynchronous state notifications. In this implementation example, communication with the MC module can be done using Winsock TCP communication, hence, MC communications can be done using a Proxy.

IMediaControl interface
HRESULT ExecuteTask(IN GUID guidMECHType, IN GUID guidTaskMajorType,
    IN GUID guidTaskMinorType, IN PBYTE pbtTaskData,
    IN DWORD dwDataSize, IN INT64 i64Context,
    OUT DWORD dwTaskId)

Called on the Media Controller F1, F9 to execute a Task of type 'guidTaskMajorType' and 'guidTaskMinorType' on the MECH F2, F8 specified by 'guidMECHType' Task information is provided through 'pbtTaskData'.

The 'i64Context' is a context value that can be returned with the execution response.

HRESULT UpdateTask(IN guidMECHType, IN DWORD dwTaskld,
 IN PBYTE phtTaskData,IN DWORD dwDataSize,
 IN INT64 i64Context)

Used to update a running Task, hence, to update the end time of the span being retrieved.
HRESULT TerminateTask(IN DWORD dwTaskId)

Called on the Media Controller F1, F9 to terminate a currently executing Task, this call can result in a corresponding OnTaskState notification.
HRESULT GetConfiguration(IN GUID guidMECHType,
 IN OUT PBYTE pbtConfigBuffer,
 IN OUT PDWORD pdwConfigBufSize)

A synchronous method used to get the configuration data of the MECH module F2, F8 specified by 'guidMECHType', the data is returned through 'pbtConfigBuffer' and its size is returned through 'pdwConfigBufSize', this data is handled and parsed by the MECH specific configuration module.
HRESULT SetConfiguration(IN GUID guidMECHType,
 IN PBYTE pbtConfigBuffer,
 IN DWORD dwConfigBufSize)

A synchronous method used to set the configuration data of the MECH module F2, F8 specified by 'guidMECHType', the configuration data is resembled by 'pbtConfigBuffer' and its size is set through 'pdwConfigBufSize', this data is handled and parsed by the MECH module F2, F8.

IMediaControlSink Interface D02 (FIG. 5)
HRESULT OnTaskState(IN DWORD dwTaskld, IN DWORD dwState,
 IN PBYTE pbtData, IN DWORD dwDataSize,
 IN INT64 i64ConteXt)

Can be used to report Task related information such as Task termination, Task error, and Task completion. The 'i64Context' is the context value sent through the ExecuteTask method.
HRESULT OnMediaControlState(IN DWORD dwState, IN PBYTE pbtData,
 IN DWORD dwDataSize, IN INT64 i64Context)

Can be used to report Media Node specific information such as performance alerts, MECH module registration and Media Node error notifications. The 'i64Context' is the context value sent through the ExecuteTask method.

Although various embodiments have been described herein, it should be realized that a wide variety of further and other embodiments is possible. The present embodiments are thus to be considered in all respects as illustrative and not restrictive; those skilled in the art will appreciate that various modifications, additions and substitutions are possible without detracting from the scope of description. All changes which come within the meaning and range of equivalency of the claims are intended to be embraced therein.

What is claimed is:

1. A method for setting up and reconfiguring a multimedia system dynamically to transport and process streams of multimedia data comprising the steps of:
 creating transmitting media elements in source media nodes and receiving media elements in destination media nodes;
 creating a first set of pairs of the transmitting media elements and the receiving media elements;
 providing a stream of the multimedia data to at least one pair of the first set of pairs including the steps of:
  creating, in the source media node, a listener for at least one network associated with the source media node;
  if a destination media element channel interface (MECH) exists, configuring, in the destination media node, the destination MECH to provide processing and storage for a channel;
  if the destination MECH does not exist, creating, in the destination media node, the destination MECH;
  creating, in the destination media node, a link between a receiver (RX) in the destination media node and at least one of the plurality of media elements;
  creating, in the destination media node, a media element receiving, destination/sink block interface (MERX) and associating the MERX with the RX;
  requesting, in the destination media node, through the RX, a transmitting/sourcing block interface (METX), a type, the channel, and certificate information;
  connecting the destination media node to the listener;
  sending, from the destination media node to the listener, the METX, the type, the channel, and the certificate information;
  requesting, from the destination media node, information;
  suggesting, from the destination media node, a transmission protocol to the listener;
  authenticating, in the source media node, the information, the suggestion, the METX, the type, and the certificate information;
  requesting authorization to create, in the source media node, a source MECH and a METX based on the certificate information;
  configuring, in the source media node, a transmitter (TX) with the transmission protocol and a socket;
  instructing, in the source media node, the source media controller to recreate the source MECH for processing the multimedia stream;
  creating, in the source media node, the source MECH;
  creating, in the source media node, the METX;
  associating, in the source media node, the METX with the TX;
  commanding, in the source media node, the TX to execute;
  sending, from the source media node, the transmission protocol to the RX;
  acknowledging, in the destination media node, the protocol;
  connecting, in the destination media node, the RX with the MERX;
  creating, in the destination media node, a destination streaming session;
  reporting, in the destination media node, that the RX and the MERX are connected;
  creating, in the source media node, a source streaming session; and
  reporting, in the source media node, that the TX and the METX are connected;
 adding a second set of pairs without affecting the first set of pairs;
 reconfiguring the multimedia system to provide the stream to at least one pair of the second set of pairs;
 creating a third set of pairs including transmitting media elements from the first set of pairs and receiving media elements from the second set of pairs or including receiving media elements from the first set of pairs and transmitting media elements from the second set of pairs; and reconfiguring the multimedia system to provide the stream to at least one pair of the third set of pairs.

2. The method as in claim 1 further comprising the steps of:
removing one or more pairs from the second set of pairs without affecting the first set of pairs; and
removing one or more pairs from the first set of pairs if the one or more pairs are not streaming the multimedia data.

3. The method as in claim 1 further comprising the step of:
processing the multimedia data.

4. The method as in claim 1 wherein said step of providing the multimedia data further comprises the steps of:
   (a) delivering, from the source media node, a sample of the multimedia data from the METX to the TX;
   (b) delivering, from the source media node, the sample to the RX;
   (c) delivering, in the destination media node, the sample to the MERX; and
   (d) while the stream is active, repeating said steps (a)-(c).

5. The method as in claim 1 wherein said step of adding a second set of pairs without affecting the first set of pairs comprises the steps of:
accessing a reconfiguration map;
re-configuring, in the source media node, the TX with the transmission protocol and the socket according to the reconfiguration map;
re-instructing, in the source media node, the source media controller to recreate the source MECH for processing of the multimedia stream;
re-creating, in the source media node, the source MECH;
re-creating, in the source media node, the METX;
re-associating, in the source media node, the METX with the TX;
re-commanding, in the source media node, the TX to execute;
re-sending, from the source media node, the transmission protocol to the RX;
re-acknowledging, in the destination media node, the protocol;
re-connecting, in the destination media node, the RX with the MERX;
re-creating, in the destination media node, a destination streaming session;
re-reporting, in the destination media node to the source media node, that the RX and the MERX are connected;
re-creating, in the source media node, a source streaming session; and
re-reporting, in the source media node to the destination media node, that the TX and the METX are connected.

6. The method as in claim 1 further comprising the step of:
disconnecting the stream.

7. The method as in claim 6 wherein said step of disconnecting session flow comprises the steps of:
detecting, in the source media node or the destination media node, a disconnect;
if the disconnect is detected in the source media node, signaling, in the source media node, the disconnect to the METX and the source media controller;
if the disconnect is detected in the destination media node, signaling the disconnect to the MERX and the destination media controller;
if the disconnect is detected in the source media node, disconnecting the streaming session and closing the streaming session in the source media node;
if the disconnect is detected in the destination media node, disconnecting the streaming session in the destination media node and closing the streaming session in the destination media node.

8. The method of claim 1 further comprising the steps of:
accessing a reconfiguration map;
configuring a plurality of the source media nodes and a plurality of the destination media nodes in server computers;
interconnecting the plurality of the source media nodes with the plurality of the destination media nodes; and
modifying the interconnections according to the reconfiguration map without restarting the server computers.

9. The method of claim 1 further comprising the step of:
creating configuration maps; and
when a failure is detected, executing a failover process based on the configuration maps without interrupting a stored content stream flowing to the destination media node, wherein a failing channel and a failover channel supply the multimedia data that originate from a common media source.

10. The method of claim 1 further comprising the step of:
configuring the receiving media element with long term storage;
accepting a sample of the multimedia data by the receiving media element; and
storing the multimedia data in the long term storage.

11. The method of claim 1 further comprising the steps of:
configuring the receiving media element with storage;
accepting closed caption samples associated with the multimedia data by the receiving media element;
storing the closed caption samples in the storage;
retrieving the closed caption samples from the storage through the transmitting media element before delivering the multimedia data in the stream; and
searching the storage for specific of the closed caption samples.

12. The method of claim 1 further comprising the steps of:
configuring the receiving media element with long term storage;
accepting clips associated with the multimedia data by the receiving media element;
storing selected of the clips in the long term storage and retrieving the stored clips from the long term storage; and
searching the long term storage for specific of the stored clips.

13. The method as in claim 1 further comprising the step of:
recognizing pre-selected objects within the multimedia data.

14. The method as in claim 1 further comprising the step of:
recognizing pre-selected sounds within the multimedia data.

15. A computer communications network for carrying out the steps of claim 1.

16. A node in a communications network for carrying out the steps of claim 1.

17. A computer program product comprising a computer readable memory having computer readable code embodied therein for causing a computer system to carry out the steps of claim 1.

* * * * *